UNITED STATES PATENT OFFICE.

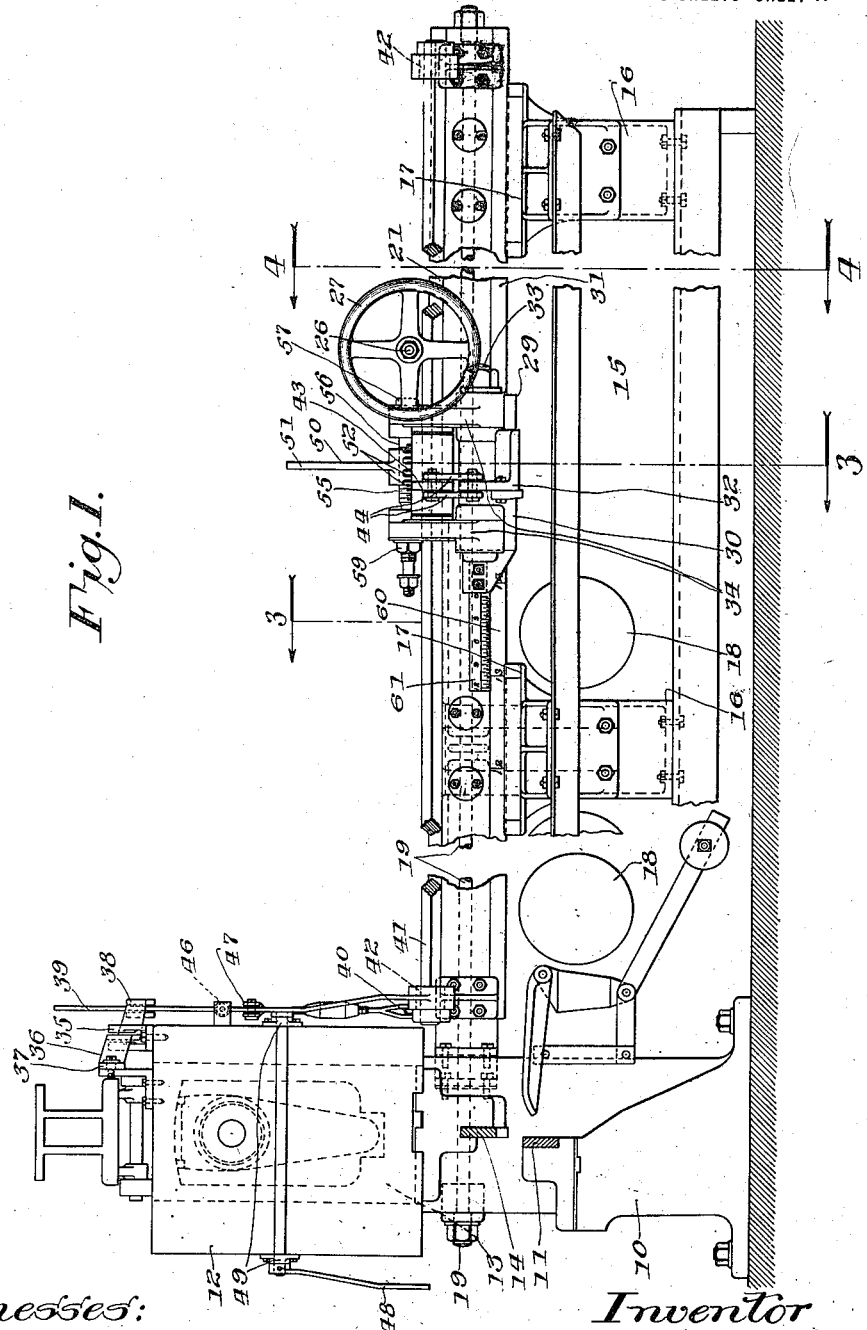

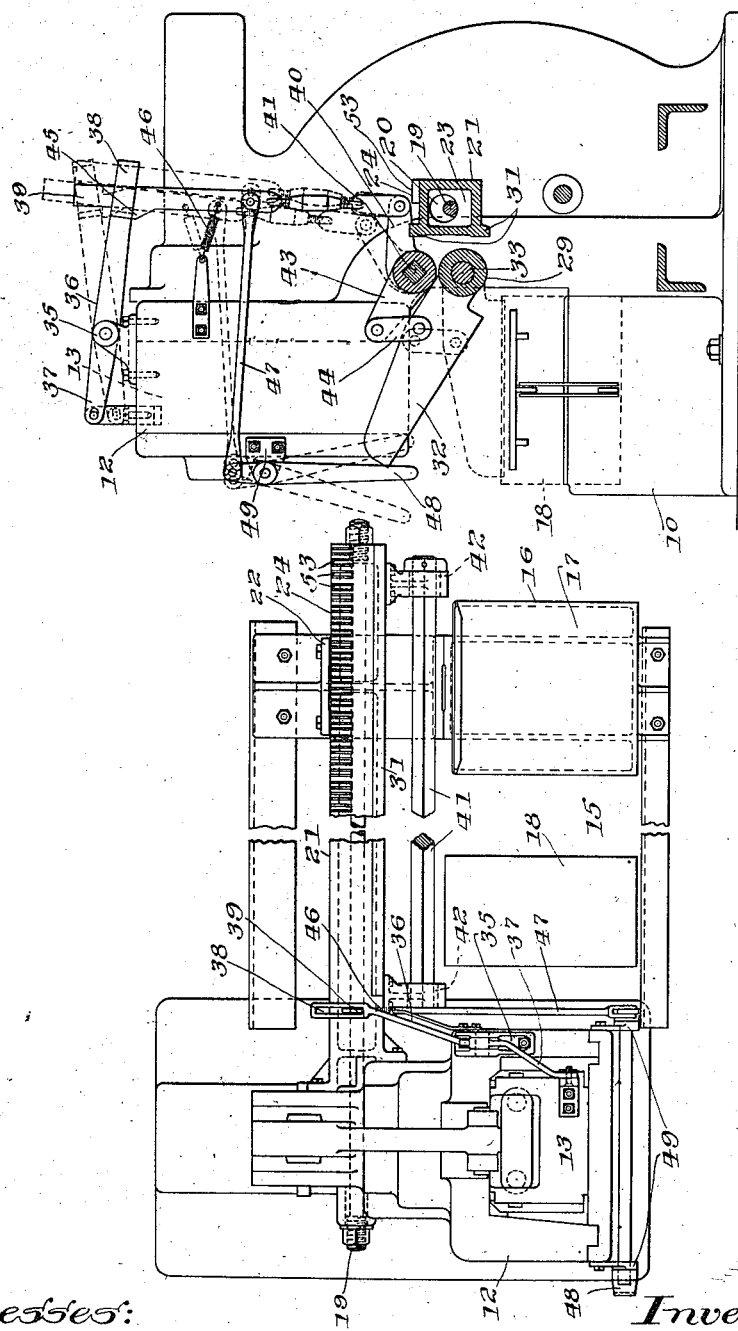

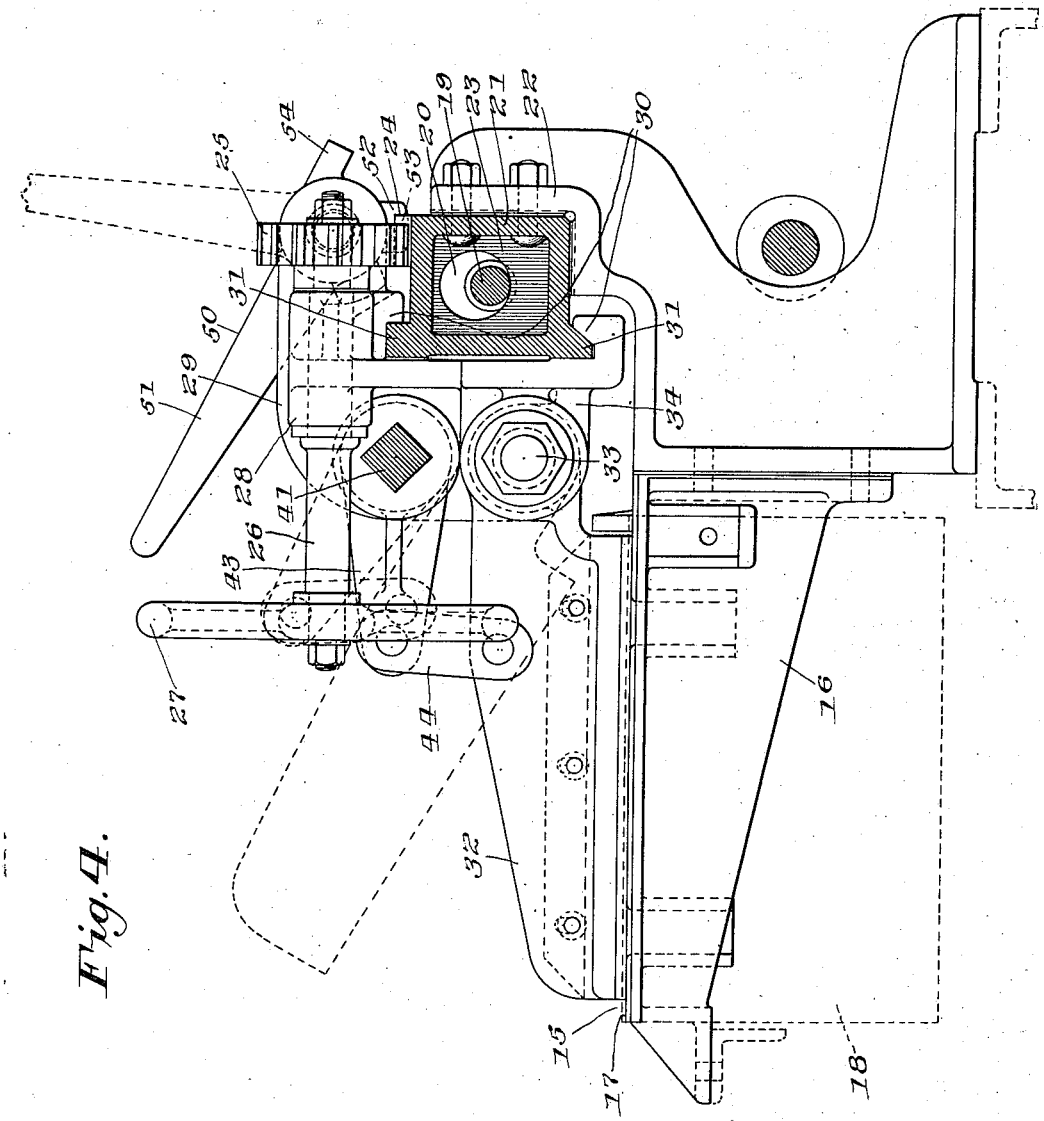

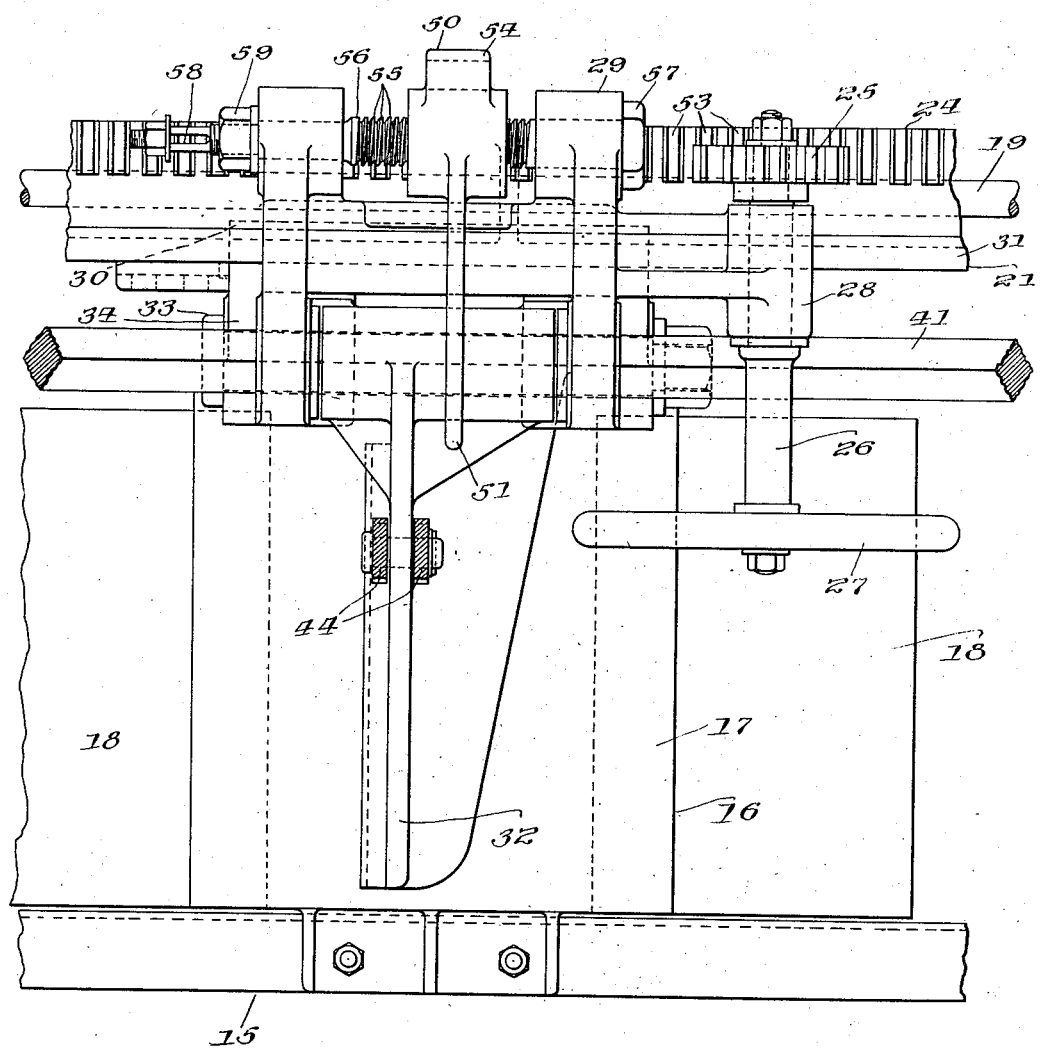

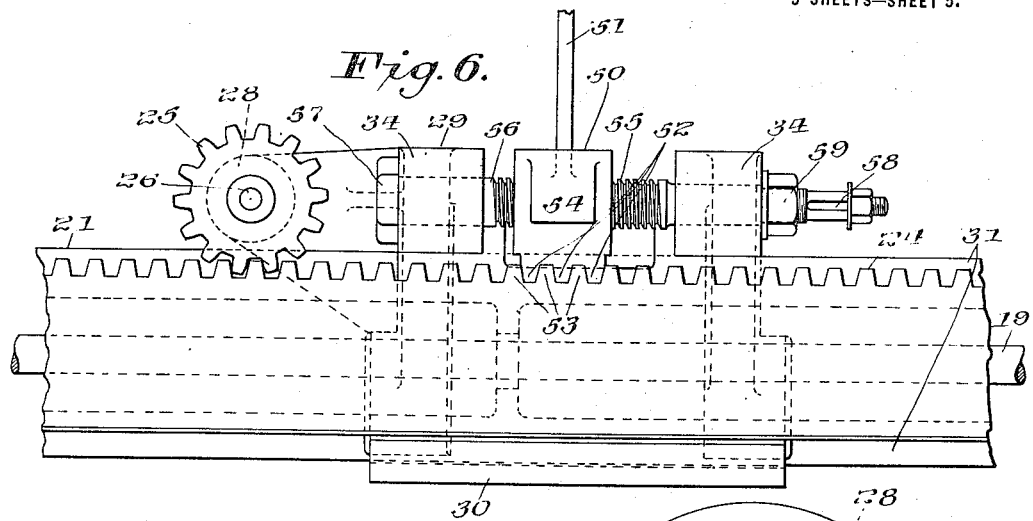
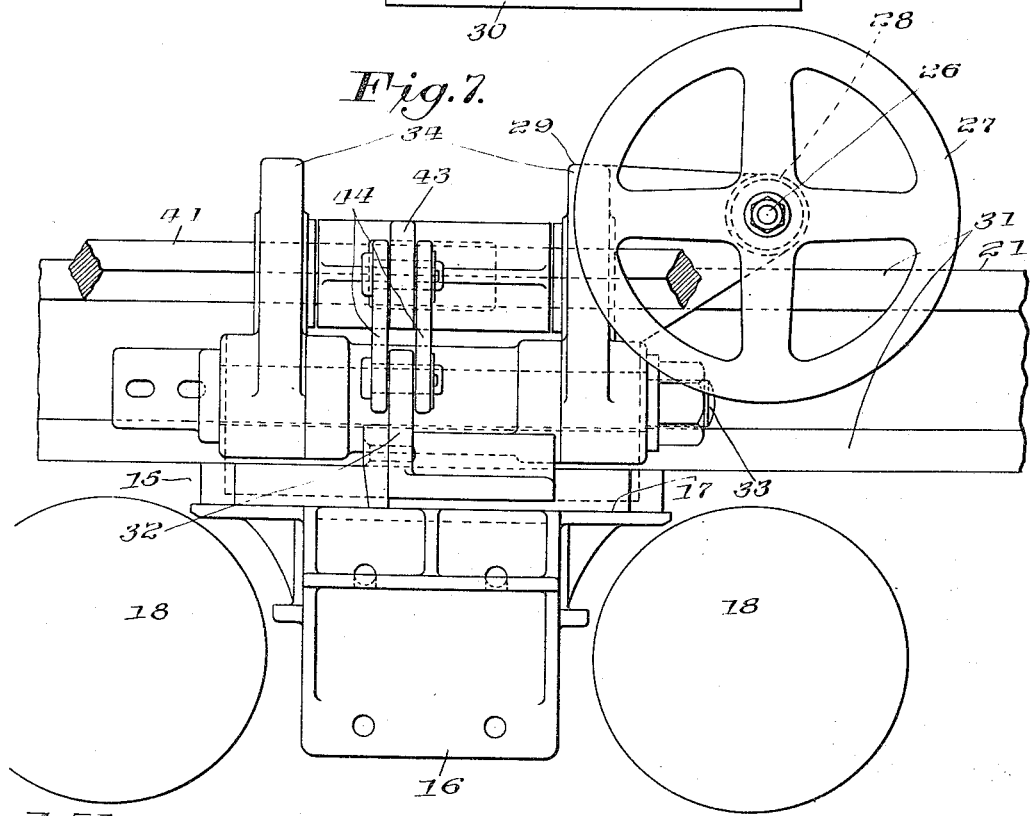

ARA U. LEONHAUSER, OF CHICAGO, ILLINOIS, ASSIGNOR TO INTERNATIONAL HARVESTER COMPANY OF NEW JERSEY, A CORPORATION OF NEW JERSEY.

SHEARING-MACHINE.

1,142,974.　　　　Specification of Letters Patent.　　Patented June 15, 1915.

Application filed August 19, 1914. Serial No. 857,569.

*To all whom it may concern:*

Be it known that I, ARA U. LEONHAUSER, a citizen of the United States, residing at Chicago, in the county of Cook and State of Illinois, have invented certain new and useful Improvements in Shearing-Machines, of which the following is a full, clear, and exact specification.

This invention relates to shearing machines, and more particularly to stopping and locking mechanism therefor.

One of the objects of this invention is to insure the proper stopping of material to be cut into definite lengths.

Another object of this invention is to insure the proper control of the stopping mechanism.

A still further object is to provide a simple and effective adjustable locking mechanism for the shear stop of the shearing machine.

These and other objects are accomplished by providing in a shearing machine the combination of a movable shearing member, a movable stop member, an operative connection between said members, and means for adjustably locking said stop member.

The invention is illustrated on the accompanying sheets of drawings, in which—

Figure 1 is a fragmentary front elevation of a shearing machine embodying my invention; Fig. 2 is a fragmentary plan view of the same machine; Fig. 3 is a side elevation, parts being in section, of the same machine, the section being taken in the planes of the irregular line 3—3 of Fig. 1; Fig. 4 is an enlarged view of the stopping and locking mechanism taken in the plane of line 4—4 of Fig. 1; Fig. 5 is a plan view of the stopping and locking mechanism; Fig. 6 is a rear elevation of the locking mechanism; and, Fig. 7 is a front elevation of the stopping mechanism.

The various novel features of my invention will be apparent from the following description and drawings, and will be particularly set forth in the appended claims.

This shearing machine includes a main standard 10 supporting the stationary shearing member 11, and having a guiding and supporting portion 12 in which the head 13 of the movable shearing member is actuated, the movable shearing member 14 being secured to said head. The movable shearing machine member 14 may be actuated in any suitable manner. This machine also includes a table 15 comprising a series of pedestals 16 having a horizontal surface 17 upon which material to be sheared is supported. Roller members 18 also are mounted in this table for feeding the material to be sheared along said table. This table, which is of considerable length, is made up of sections which are held together by a large bolt 19 passing through openings 20 in a guiding member 21, which is secured to the back portion 22 of the table, the bolt 19 being supported to prevent sagging thereof by flanges 23 formed within said member 21. Formed on the top of this guiding member 21 or secured thereto is a rack 24, which is engaged by a pinion 25 mounted upon one end of a shaft 26 having an operating hand wheel 27. This shaft is mounted in a bearing portion 28 of a carriage 29. This carriage is provided with guiding and sliding portions 30 which coöperate with guiding and sliding portions 31 formed on the guiding member 21. By means of the rack and pinion arrangement the carriage 29 may be slid along the table by operating the hand wheel 27. In this carriage 29 is mounted a stop member 32, which is mounted upon a shaft 33 having bearings in the carriage flanges 34. The sliding head 13 of the movable shear member 14 is operatively connected to the stop member 32 in the following manner: Mounted upon the upper portion 12 of frame 10 of the shears is a bracket 35 in which is pivotally mounted a lever 36, one end 37 of which is pivotally connected to the sliding head 13, the other end of which lever, having a slotted portion 38 for the reception of an adjustable link 39 pivotally connected to an arm 40, which is secured adjacent the shearing members to a squared shaft 41. This squared shaft 41 is provided with rounded or journal portions 42 by means of which it may rotate in the table 15. Slidably secured to the squared shaft is an arm 43 secured in the carriage 29, said arm having pivotally connected to one end thereof links 44, which are in turn, pivotally connected to the movable stop member 32. The adjustable link member 39 is provided with a projection 45 which normally engages the under portion of lever 36 adjacent the slot 38, a spring 46 tending to hold the projection 45 in such position. Pivotally secured to the link 39 is a link 47, to one end of which is pivotally connected a hand operated lever 48 pivotally mounted in brackets 49.

As shown in full lines in Fig. 3 the stop member 32 is in its raised position, the head 13 of the movable shearing member 14 also being in raised position. The stop member 32 is held in this raised position by means of the releasable connection between the lever 36 and the adjustable link 39, the projection 45 of said link 39 being held into operative engagement with the lever 36 by spring 46. In order to release the stop member 32, to permit it to fall to its lower position under the influence of its own weight, the hand operated lever 48 is drawn to the left, as viewed in Fig. 3, thereby forcing the projection 45 of link 39 out of engagement with the under side of lever 36, whereupon the stop falls into the dotted line position in Fig. 3, and the link 39 passes upwardly through the slot 38 in lever 36. With the stop in this lowered position material such as a metal bar may be passed between the shearing members 11 and 14, and slid along the table 15 and over the rollers 18 until such bar strikes the stop member 32, whereupon further movement of the bar to be cut is arrested. At this point the movable shear member 14 through the action of its operating head 13 may be lowered for cutting the bar. At the same time due to its connection with the operating head 13 the free end of lever 36 will rise to a point permitting the projection 45 of link 39 to pass under a portion of the lever due to the action of spring 46. With the parts in this position it is apparent that when the movable shear member 14 and its head 13 are raised the stop member 32 also will be raised due to the operative connection between said parts.

The stop member 32 is mounted on the carriage 29 to enable the cutting of material into different lengths. As stated above the carriage may be actuated by operating the hand wheel 27, which in turn rotates the pinion 25, the latter meshing with the stationary rack 24 over which said pinion passes. The carriage may be locked in any adjusted position by a locking member 50, including a handle 51 and a plurality of locking projections 52 which are adapted to engage with teeth 53 of the rack 24. This locking member also is provided with a projection 54, which may engage the member 21 for limiting the movement of the locking member in one direction. This locking member is provided with an internally threaded portion, the threads of which engage the threads 55 of a threaded member 56, which is movably supported in the carriage flanges 34. This threaded member 56 passes through and is journaled in these flanges 34, and has at one end a head 57 and at the other end an opening 58 for the reception of a wrench for actuating the thread member 56 for final adjustment. This threaded member 56 also is provided with a lock nut 59, which is loosened before and tightened after an adjustment is made. By means of this arrangement the position of the stop member 32 may be definitely determined for cutting bars or other material into desired lengths within very small fractions of an inch. For the rough adjustment, the hand wheel 27 may be actuated to move the stop to approximately the proper place, during this time the locking member 50 being in position shown by dotted lines in Fig. 4, that is, with the locking projections 52 out of engagement with the teeth of the rack 24. When the stop 32 has been moved to approximately the proper position, the locking member 50 is thrown into the full line position shown in Fig. 4, placing the locking projections 52 in mesh with the teeth of the rack 24, thereby locking the carriage in such position. If, however, it is desired to move the carriage and stop member a small distance one way or the other this may be accomplished by loosening lock nut 59 and turning threaded member 56 until the stop is accurately placed in the proper position, whereupon the lock nut 59 may be tightened. By means of this arrangement the stop member may be accurately adjusted and locked in such adjusted position. For measuring purposes the table is provided with a scale 60 marking the number of feet, and the carriage is provided with a scale 61 indicating fractional parts of a foot. This furnishes a micrometer arrangement for accurate measurements. With the stop member 32 in the position shown in Fig. 1 the scale indicates that the distance between the shear members 11 and 14 and the stop member 32 is thirteen feet, ten and one-half inches.

In summing up the operation of this machine let it be assumed that it is desired to cut from a piece of material a bar thirteen feet, ten and one-half inches long. The stop member 32 will be placed in the proper position, as hereinabove described, and the hand operated lever 48 moved to the left, as viewed in Fig. 3. This movement of lever 48 will shift the link 39 into a position such that the projection 45 will escape its coöperating locking portion on lever 36, permitting the stop member 32 to fall due to its own weight, to its lower operative position, as indicated in dotted lines in Fig. 3. The bar or material to be cut will then be passed between the shear members 11 and 14 and fed over the rollers 18 and surface 17 of the table 15 until the end of the bar strikes the stop member 32, causing further movement of said bar to be arrested. At this point the movable shearing member 14 may be lowered for shearing off the bar. As the movable shearing member is lowered the right hand end of lever 36, as viewed in Fig. 3, is lifted sufficiently high to permit spring 46 to move the projection 45 of link 39 under the lever 36, whereupon during the raising movement of the movable shearing member 14 and its head 13 the stop member 32 will be raised to its full line position, as shown in Fig. 3. If it is desired to cut other bars into the same length the operation may be repeated. If it is desired to cut bars into different lengths, the position of the stop member may be changed, and stop member locked in its adjusted position, as hereinabove described.

It is evident that there may be various modifications of my invention as herein particularly shown and described, and it is my intention to cover all such modifications which do not involve a departure from the spirit and scope of my invention as set forth in the following claims.

What I claim is:

1. In a shearing machine, a movable shear member, a stop member, and an operative connection between said shear and stop members whereby said stop member is collapsed.

2. In a shearing machine, the combination of a movable shear member, a movable stop member, and means whereby raising movement of said stop member is controlled by raising movement of said shear member.

3. In a shearing machine, the combination of a movable shear member, a movable stop member, movement in one direction of said stop member being controlled by said shear member, and trip means for controlling movement of said stop member in another direction.

4. In a shearing machine, the combination of a movable shear member, a stop member, and a releasable trip connection between said shear and stop members.

5. In a shearing machine, the combination of a movable shear member, a stop member, and means whereby said stop member may be raised by said shear member as it rises.

6. In a shearing machine, the combination of a movable shear member, a stop member, means whereby said stop member may be actuated in one direction by said shear member, and manual means for controlling movement of said stop member in another direction.

7. In a shearing machine, the combination of a movable shear member, a movable stop member, a releasable connection between said shear and stop members, said connection being operative to permit raising of said stop member by said shear member, and means for releasing said connection for permitting said stop member to lower.

8. In a shearing machine, the combination of a movable shear member, a movable stop member, a pivotally mounted lever operatively connected to said shear member, a link operatively connected to said stop member, a releasable connection between said lever and link, and means for controlling said connection.

9. In a shearing machine, the combination of a movable shear member, a traveling carriage, a stop member supported by said carriage, and an operative connection between said shear and stop members.

10. In a shearing machine, the combination of a movable shear member, a movable carriage, a stop member supported by said carriage, an operative connection between said shear and stop members, and means for adjusting the position of said carriage.

11. In a shearing machine, the combination of a movable shear member, a movable carriage, a stop member supported by said carriage, an operative connection between said shear and stop members, means for adjusting the position of said carriage, and means for controlling the operativeness of said connection.

12. In a shearing machine, the combination of a movable shear member, a stop member, an operative connection between said shear and stop members, and means for locking said stop member against movement.

13. In a shearing machine, the combination of a movable shear member, a movable stop member, an operative connection between said shear and stop members, means for adjusting the position of said stop member, and means for locking said stop member in said adjusted position.

14. In a shearing machine, the combination of a movable shear member, a movable stop member, an operative connection between said shear and stop members, means for shifting the position of said stop member, and a locking member associated with said means for locking said stop member in an adjusted position.

15. In a shearing machine, the combination of a movable shear member, a stop member, an operative connection between the shear and stop members, coöperating rack and pinion for shifting the position of said stop member, and a member for engaging said rack to lock said stop member against movement.

16. In a shearing machine, the combination of a movable shear member, a stop member, an operative connection between said shear and stop members, a movable carriage upon which said stop member is mounted, a rack, a pinion carried by said carriage coöperating with said rack to operate said carriage, and a locking member carried by said carriage for engaging said rack to lock said stop member against movement.

17. In a shearing machine, a table having a rack, a carriage supported by said table and having means coöperating with said rack to operate said carriage, a stop member mounted on said carriage, a threaded member mounted on said carriage, and a locking member mounted on said threaded member and having a portion to engage said rack to lock said stop member in an adjusted position.

18. In a shearing machine, the combination of a table having a rack, a carriage supported by said table, a stop mounted on said carriage, a pinion supported by said carriage and coöperating with said rack to actuate said carriage, a threaded member mounted in said carriage, and a locking member embracing said threaded member and having a portion for engaging said rack to lock said stop member in an adjusted position, said threaded member being adjustable with respect to said locking member for shifting the position of said stop member.

19. In a shearing machine, the combination of a table, a carriage supported thereby, a stop mounted on said carriage, a threaded member mounted on said carriage, a locking member associated with said threaded member for locking said stop in an adjusted position, and means for actuating said threaded member to give said stop a more accurate adjustment.

In testimony whereof I affix my signature, in the presence of two witnesses.

ARA U. LEONHAUSER.

Witnesses:
K. S. BAETZMANN,
H. P. LEROKE.